(12) United States Patent
Sarkar et al.

(10) Patent No.: US 7,173,911 B1
(45) Date of Patent: Feb. 6, 2007

(54) SYSTEM AND METHOD FOR MUSIC-ON-HOLD IN A VOICE OVER INTERNET PROTOCOL (VOIP) ENVIRONMENT

(75) Inventors: Shantanu Sarkar, San Jose, CA (US); Thiyagesan Ramalingam, Sunnyvale, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 988 days.

(21) Appl. No.: 10/035,573

(22) Filed: Dec. 28, 2001

(51) Int. Cl.
*H04L 12/26* (2006.01)
*H04L 12/66* (2006.01)

(52) U.S. Cl. .................... 370/252; 370/353
(58) Field of Classification Search ............... 370/353, 370/355, 389, 395.4, 395.43, 252; 379/1.03–1.04, 379/215.01
See application file for complete search history.

(56) References Cited

U.S. PATENT DOCUMENTS

| | | | |
|---|---|---|---|
| 5,838,683 A | 11/1998 | Corley et al. | 370/408 |
| 6,418,138 B1 * | 7/2002 | Cerf et al. | 370/352 |
| 6,526,041 B1 | 2/2003 | Shaffer et al. | 370/352 |
| 6,545,589 B1 | 4/2003 | Fuller et al. | 340/7.22 |
| 6,577,648 B1 * | 6/2003 | Raisanen et al. | 370/503 |
| 6,658,000 B1 * | 12/2003 | Raciborski et al. | 370/386 |
| 6,683,938 B1 | 1/2004 | Henderson | 379/67.1 |
| 6,690,651 B1 * | 2/2004 | Lamarque et al. | 370/252 |
| 6,707,797 B1 | 3/2004 | Gardell et al. | 370/260 |
| 6,853,719 B2 * | 2/2005 | McCormack et al. | 379/215.01 |
| 6,947,417 B2 * | 9/2005 | Laursen et al. | 370/389 |
| 2001/0028649 A1 | 10/2001 | Pogossiants | 370/389 |
| 2002/0136384 A1 | 9/2002 | McCormack et al. | 379/215.01 |
| 2002/0176404 A1 | 11/2002 | Girard | 370/352 |
| 2003/0035471 A1 | 2/2003 | Pitsoulakis | 375/222 |
| 2003/0118003 A1 | 6/2003 | Geck et al. | 370/352 |
| 2004/0047359 A1 | 3/2004 | Jacobs et al. | 370/402 |
| 2004/0047461 A1 | 3/2004 | Weisman et al. | 379/202.01 |
| 2004/0052242 A1 | 3/2004 | Laturell | 370/352 |
| 2004/0136327 A1 * | 7/2004 | Sitaraman et al. | 370/252 |

* cited by examiner

*Primary Examiner*—Chau Nguyen
*Assistant Examiner*—Kerri M. Rose
(74) *Attorney, Agent, or Firm*—Baker Botts L.L.P.

(57) ABSTRACT

This method for music-on-hold in a voiceover Internet Protocol (VoIP) environment includes determining a quality value for each of a plurality of audio streams communicated in the VoIP format. One of the audio streams may be selected for playing to a call on hold based on the quality values for the audio streams. In that particular embodiment, the quality values may be determined at and/or near the endpoint handling that call on hold.

58 Claims, 3 Drawing Sheets

SYSTEM AND METHOD FOR MUSIC-ON-HOLD IN A VOICE OVER INTERNET PROTOCOL (VOIP) ENVIRONMENT

TECHNICAL FIELD OF THE INVENTION

The present invention relates generally to the field of packet based communication networks and more particularly to a system and method for music-on-hold in a voice over Internet Protocol (VoIP) environment.

BACKGROUND OF THE INVENTION

Telecommunication networks include circuit-switched networks such as plain old telephone service (POTS) and packet-switched networks such as the Internet Protocol (IP) network to transport voice and data between remote end users. The circuit-switched networks utilize transmission paths dedicated to specific users for the duration of a call and employ continuous, fixed bandwidth transmission. The packet-switched networks allow dynamic bandwidth and can be connectionless networks with no dedicated path or connection-oriented networks with virtual circuits having dedicated bandwidth along a predetermined path. Because packet-switched networks allow traffic from multiple users to share communication links, these networks use available bandwidth more efficiently than circuit-switched networks.

IP networks are connectionless packet-switched networks that break up streams of information into addressable packets. Each IP packet includes source and destination addresses and can take any available route between the source and destination. The IP packets are transmitted independently and then reassembled in the proper sequence at the destination.

Telephone calls and other voice traffic may be transmitted in an IP network using voice over IP (VoIP). In a VoIP environment, music-on-hold is implemented using music-on-hold servers that unicast or multicast music-on-hold streams. For better network utilization, multicast is usually preferred. Multicast streams are played out to trunking endpoints, which then transmit music to other endpoints that are on hold. Typically, a call manager identifies the music-on-hold stream and/or server for use by an endpoint and takes action in case the identified music-on-hold server fails.

SUMMARY OF THE INVENTION

The present invention provides a system and method for music-on-hold in a voice over Internet Protocol (VoIP) environment that substantially eliminates or reduces the problems and disadvantages associated with previous methods and systems. In a particular embodiment, the quality of music-on-hold streams available to an endpoint is monitored at and/or close to the endpoint and a high-quality music-on-hold stream and/or a music-on-hold server having high quality streams is selected and used by the endpoint for calls on hold.

In accordance with one embodiment of the present invention, a system of method for providing an audio stream in a voice over Internet Protocol (VoIP) environment includes determining a quality value for each of a plurality of audio streams communicated in a VoIP format. One of the audio streams is selected for playing to a call on hold based on the quality values for the audio streams.

In that particular embodiment, the audio stream may comprise a music-on-hold channel on a music-on-hold server. In this and other embodiments, the quality value may include packet jitter and/or packet lose. The music-on-hold and other audio streams may be monitored at a packet endpoint or at an edge router connected to the endpoint. If none of the monitored music-on-hold streams have an acceptable quality, a local audio file may be played to the call on hold. In addition, poor quality audio streams may be identified to upstream routers to enable discard of the streams in the network.

Technical advantages of the present invention include providing an improved system and method for music-on-hold in a VoIP environment. In particular, music-on-hold streams and/or servers are selected and/or used by a network endpoint or other suitable device based on quality of the streams. In this way, high quality music-on-hold is played out at the endpoint even if the quality of a particular path between endpoint and a specific music-on-hold server degrades. Thus, quality of service of the VoIP network is enhanced.

Another technical advantage of the present invention includes providing a locally stored audio file at an endpoint for music-on-hold. During network outages or other events in which the endpoint loses connectivity to all music-on-hold servers, the endpoint uses the locally stored audio file to provide music-on-hold. In this way, the endpoint continues to provide good audio quality music during network outages.

Still another technical advantage of the present invention includes determining the quality of music-on-hold streams at edge routers. The routers communicate with the endpoints to convey voice quality related information about the streams. Monitoring quality at the edge routers reduces the amount of information transmitted to the endpoint and the amount of bandwidth required or used by the endpoint. Thus, quality-based selection of music-on-hold servers and/or audio streams may be deployed where bandwidth between the endpoint and the edge router is limited.

Other technical advantages of the present invention include providing communication between routers in an IP network to convey voice quality related information for music-on-hold or other audio streams. This enables routers to inform their neighbors to stop broadcasting voice streams that are of poor quality as far upstream as possible, which reduces the amount of network resources and bandwidth wasted in carrying audio streams of poor quality. In this way, the time-to-live parameter for multicast streams is enhanced with a voice quality parameter and streams with poor voice quality are discarded regardless of the remaining time value of the parameter.

Other technical advantages of the present invention will be readily apparent to one skilled in the art from the following figures, description and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
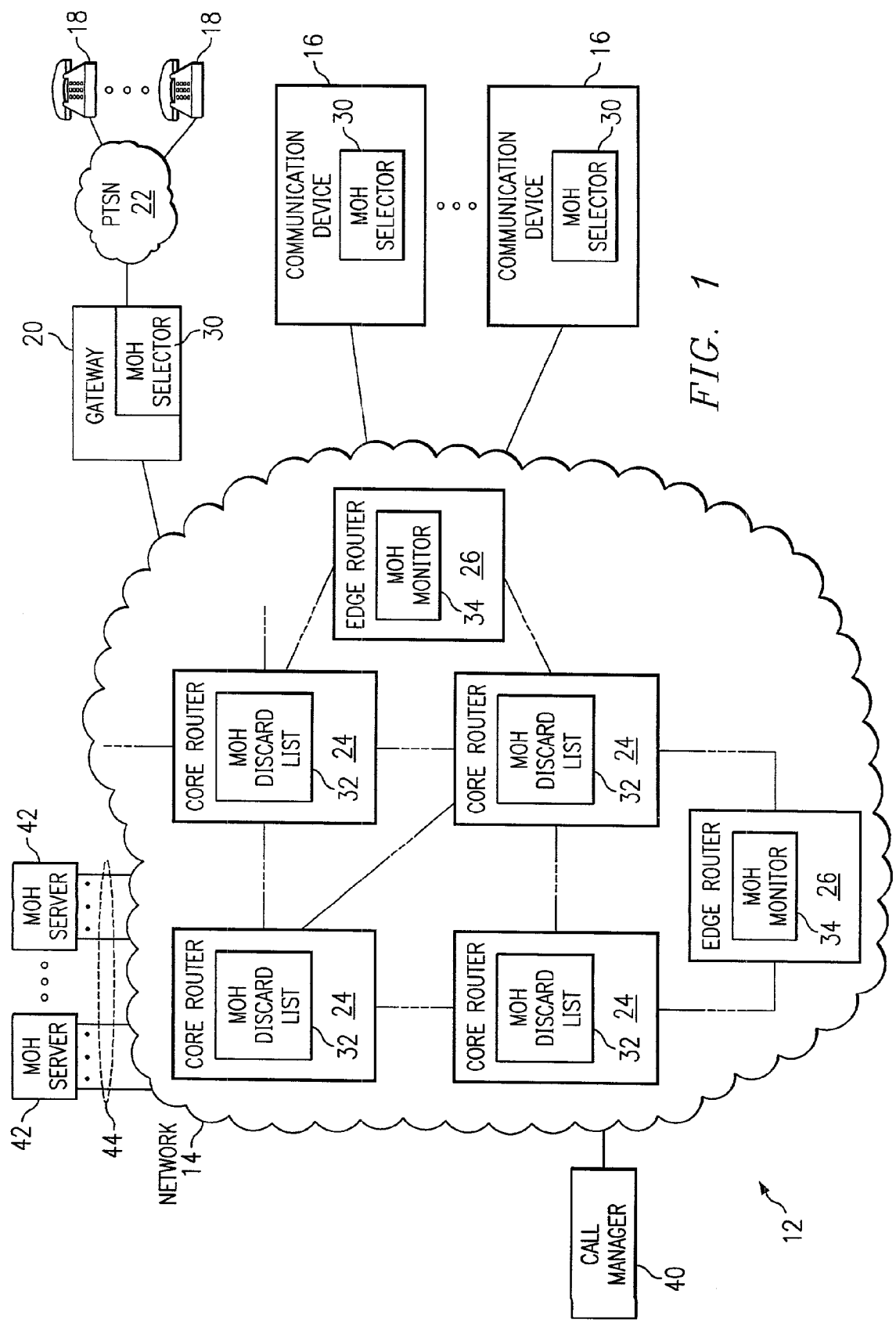
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non-real-time traffic between source and destination endpoints.

Referring to FIG. 1, the communications system 12 includes a network 14 connecting a plurality of communication devices 16 to each other and to standard analog telephones 18 through a gateway 20 and the Public Switched Telephone Network (PSTN) 22. The communication devices 16, standard analog telephones 18 and gateway 20 are connected to the network 14 and/or PSTN 22 through twisted pair, cable, fiber optic, radio frequency, infrared, microwave and/or any other suitable wire line or wireless link.

In one embodiment, the network 14 is the Internet, a wide area network (WAN), a local area network (LAN), or other suitable packet-switched network. In the Internet embodiment, the network 14 transmits Internet Protocol (IP) packets and includes a plurality of core routers 24, edge routers 26 and/or other suitable network elements operable to direct the IP packets between source and destination endpoints. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable type of network and that traffic may be otherwise suitably transmitted using other protocols and formats.

In the network 14, the core routers 24 are interconnected to each other and are connected between the edge routers 26. The core routers 24 as well as the edge routers 26 route IP packets based on address information. In one embodiment, as described in more detail below, the core routers 24 each include a music-on-hold discard list 32 and the edge routers 26 each include a music-on-hold monitor 34. In this embodiment, the edge routers 26 monitor music-on-hold streams used by attached endpoints and communicate with the core routers to identify music-on-hold streams that are of poor quality that at the edge router. The core routers 24 store the identity of the poor quality music-on-hold streams and discard the identified streams to reduce the amount of network resources and bandwidth used in caring audio streams of poor quality. In a particular embodiment, a core router 24 may drop a music-on-hold or other audio stream when each edge router 26 to which the stream is multicast or otherwise forwarded by the core router 24 identifies the stream as of poor quality. In this way, the network 14 provides a voice quality parameter in conjunction with time-to-live parameters for multicast streams. Streams with poor voice quality are discarded regardless of the remaining value of the time-to-live parameter. Control information identifying poor quality streams may be transmitted in-band or out-of-band between routers 24 and 26 and/or other devices. A poor quality stream is a stream with disruptions in packet delivery to an endpoint such that, for example, dropped packets and/or delays can be perceived by the listener when played by the endpoint. Conversely, a high quality stream has minimal disruptions in delivery to the endpoint such that dropped and/or delayed packets are not discernable to the listener, not readily discernable and/or are not typically discernable. The quality of a stream may be measured or otherwise determined based on packet drops, jitter and other suitable metrics.

The communication devices 16 comprise IP or other digital telephones, personal or other suitable computers or computing devices, personal digital assistance (PDAs), cell or other mobile telephones or any other suitable handheld or other device capable for communicating real-time audio, video and/or other information over the network 14. In a particular embodiment, the communication device 16 may connect a plurality of communication devices to the network 14. For example, the communication device 16 may comprise an interactive voice response (IVR) system of a call center. The communication devices 16 also communicate control information with the network 14 to control call set up, tear down and processing as well as call services.

In the Internet embodiment, the communication devices 16 communicate voice traffic in the VoIP format. The standard analog telephones 18 communicate standard telephony signals through PSTN 22 to the gateway 20. At the gateway 20, the signals are converted to IP packets in the VoIP format. As previously described, the IP packets from the communication devices 16 and the gateway 20 are encapsulated in the RTP protocol for transmission over the network 14.

The communication devices 16 and gateway 20 each comprise an IP endpoint at which packets are converted into video, audio, analog and/or other suitable signals for display, play and/or other suitable presentation to the user or further forwarding to the user over a non-IP network.

In one embodiment, the communication devices 16 and the gateway 20 each include a audio stream selector such as a music-on-hold (MOH) selector 30. As used herein, the term each means every one of at least a subset of the identified items. The music-on-hold selectors 30 select music-on-hold streams and/or servers for playing to calls on hold. The call on hold may be a telephony call, a video call, a conference call or other suitable connection or session between user devices, computers and/or other suitable equipment.

A call manager 40 and music-on-hold servers 42 may be connected to the network 14. The call manager 40 and servers 42 may be located in a central facility or have their functionality distributed across and/or at the periphery of the network 14. The call manager 40 and servers 42 are connected to the network 14 by any suitable type of wire line or wireless links.

The call manager 40 sets up, tears down and otherwise manages communication connections across the network 14.

The communication connections may be between two or more parties. The parties may be persons and/or equipment such as computers. The connections may be real-time connections, connections having real-time characteristics and/or non-real-time connections. In a particular embodiment, network 14 may operate without the call manager 40, in which case the communication devices 16 and gateway 20 may communicate control information directly with each other or with other suitable network elements.

The call manager 40 is responsive to service requests from the communication devices 16 and the gateway 20. For example, the call manager 40 may provide voicemail, bridging, multicasting, call hold and other suitable services for the communication devices 16 and standard telephones 18. In one embodiment, the call manager 40 is responsive to call on hold signals initiated by the communication devices 16, gateway 20 or other endpoint. In this embodiment, the call manager 40 may initially direct the endpoint to use a specified music-on-hold channel or server and/or may provide a list of servers or channels from which the endpoint may or must select for playing to a call on hold. The list may be a file or any other suitable set of information identifying one or more music-on-hold channels. The list may be communicated over a control channel. A channel may be a specific channel of a server, a server or other suitable source.

The music-on-hold servers 42 may each store, generate, convert or otherwise transmit and/or provide one or more music-on-hold channels 44 to the network 14. The music-on-hold channels 44 may be unicast or multicast by the music-on-hold servers 42. Typically, the music-on-hold channels 44 are multicast for better network utilization. The music-on-hold channels 44 may be otherwise suitably transmitted within the network 14.

Figure 2:
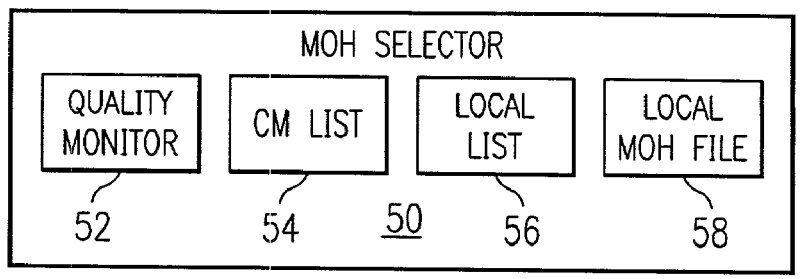
FIG. 2 is a block diagram illustrating details of the music-on-hold selector of FIG. 1 in accordance with one embodiment of the present invention.

FIG. 2 illustrates details of a music-on-hold selector 50 for an endpoint in accordance with one embodiment of the present invention. In this embodiment, the music-on-hold selector 50, other components of the communication device 16 and/or gateway 20, as well as of the system 12 may comprise logic encoded in media. The logic comprises functional instructions for carrying out programmed tasks. The media comprises computer disks or other suitable computer-readable media, application specific integrated circuits (ASIC), field programmable gate arrays (FPGA), digital signal processor (DSP) or other suitable specific or general purpose processors, transmission media or other suitable media in which logic may be encoded and utilized.

Referring to FIG. 2, the music-on-hold selector 50 includes a quality monitor 52, a call manager list 54, a local list 56 and a local music-on-hold file 58. The quality monitor 52 monitors quality of a plurality of available music-on-hold streams or channels. The available streams are streams that are received or are receivable by the associated endpoint 16 or 20 and that can be played by the endpoint. The available music-on-hold streams may include streams identified by the call manager 40 in the call manager list 54, streams identified by other suitable network entities and/or streams used locally by the endpoint or by approximate endpoints to serve their users. For example, such locally used streams may comprise streams serving other users connected to different trunks on a same trunking gateway.

The locally used streams may be determined through control channel requests to neighboring endpoints, seeking local use databases, by discovery protocols and the like. The locally used streams may be identified in the local list table 56. The local file 58 may be omitted in some embodiments. In addition, one or more of the lists may be omitted with monitored streams being otherwise suitably identified.

The call manager list 54 is received and/or based on information from the call manager 40. The call manager list 54 may be received over a control or other suitable channel. The call manager list 54 may be periodically updated by the call manager 40. The local list 56 is generated by the music-on-hold selector 50 and may also be periodically updated.

The call manager list 54 and the local list 56 may each include an identifier for each listed music-on-hold stream and a quality value associated with the stream. The quality values may represent a current quality associated with the stream and be based on real-time performance of the stream. In one embodiment, the current quality values comprise a running average over several minutes or other suitable period of time. In a particular embodiment, the current quality value may comprise a sliding window of the number of times, the duration of time and/or the percentage of time the corresponding stream is above and/or below threshold values of quality metrics and indicators.

The lists 54 and 56 may comprise tables having a row associated with each stream and a column providing the identifier for the stream and a second column providing the current quality value for the corresponding stream. A local music-on-hold file 56 comprises a wave file or other suitable file that can be played to calls on hold.

In operation, the quality monitor 52 repetitively and/or continuously monitors the listed or otherwise available streams and determines an incremental or other quality value for each stream. The quality value may be determined based on a single metric or a plurality of metrics. For example, the quality value may be determined based on packet loss and/or jitter for each stream. The quality value for each stream is recorded in the corresponding table 54 or 56.

In response to at least a call being placed on hold and thus subject to other intervening events, the music-on-hold selector 50 accesses the call manager list 54 and/or the local list 56 to select a high quality music-on-hold stream for playing to the call. A stream may be selected by determining the channel of the stream and requesting and/or accessing the channel. The selected streams, as well as quality values, may be communicated in out-of-band control channels. The selected stream may be a highest quality stream determined from the highest quality value or a stream with a high preference and an acceptable quality value. The music-on-hold streams having an acceptable quality value may be determined based on a corresponding threshold which may be predefined or variable. The user may have the option to choose one media stream from present streams with only good quality streams being presented. In this embodiment, good quality streams may be presented to a user on a display with representative title of the streams indicated.

After selection, the selected stream is played to the call on hold. If none of the monitored music-on-hold streams has a minimal acceptable quality, the music-on-hold selector 50 may select and play the local music-on-hold file 58. Thus, even during partial network outages, music is provided to the call on hold.

Figure 3:
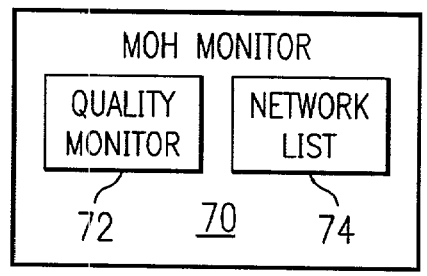
FIG. 3 is a block diagram illustrating details of the music-on-hold monitor of FIG. 1 in accordance with one embodiment of the present invention.

FIG. 3 illustrates details of a music-on-hold monitor 70 in accordance with one embodiment of the present invention. The music-on-hold monitor 70 may be used in the edge routers 26 to determine quality of available music-on-hold streams and to provide the results to the endpoint. The endpoint may then make decisions on which of the music-on-hold streams to receive and may request the router to send the selected steams and/or to not send the remaining streams. If the time to live parameter of the audio stream is enhanced with voice quality indicators, the time to live of a stream may be based partially on feedback from the endpoint and the router will not forward the audio stream over the time to live. In these embodiments, the amount of bandwidth used and/or required by the endpoint is reduced as each music-on-hold channel need not be transmitted to the endpoint for monitoring. The voice quality related information may be conveyed by the edge router 26 to the endpoint 16 or 20 through an out-of-band control channel, extensions to IGMP or other suitable protocols.

Referring to FIG. 3, the music-on-hold monitor 70 includes a quality monitor 72 and a network list 74. The quality monitor 72 monitors quality of music-on-hold streams identified by the network list 74 and updates the list as described in connection with the quality monitor 52 and list 54 and 56 of the music-on-hold selector 50.

The network list 74 may include music-on-hold streams identified by the call monitor 40, identified by another suitable network entity and/or used by connected endpoints to serve their users. As described in connection with the call manager and local list 54 and 56 of the music-on-hold selector 50, the network list 74 may include an identifier and a quality value for each monitored music-on-hold stream.

In operation, the quality monitor 72 repetitively and/or continuously monitors the quality of the identified music-on-hold streams and updates the quality value in the network list 74. The quality value may be updated one or more times per second or every several seconds. The quality value may the number of times, duration of time and/or percentage of time the stream is above and/or below threshold values of quality metrics or indicators. Packet loss, jitter and other metrics may be determined from a receiving queue, queue manager or other suitable element. The music-on-hold monitor 70 may communicate the network list 74, including the quality values to endpoints 16 and 20 on a periodic basis or when requested by the endpoint. In another embodiment, the music-on-hold monitor 70 may transmit the identifiers of the highest quality music-on-hold stream or identifiers of music-on-hold streams having an acceptable quality value.

Figure 4:
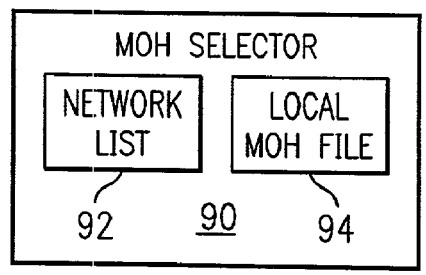
FIG. 4 is a block diagram illustrating details of the music-on-hold selector of FIG. 1 in accordance with another embodiment of the present invention.

FIG. 4 illustrates a music-on-hold selector 90 for use in connection with the music-on-hold monitor 70. In this embodiment, the music-on-hold selector 90 includes a network list 92 and a local music-on-hold file 94. The network list 92 is the network list 74 or suitable part thereof downloaded by the music-on-hold monitor 70. The local music-on-hold file 94 comprises a suitable file for playing to a call on hold when other music-on-hold channels are unavailable or of poor quality.

Figure 5:
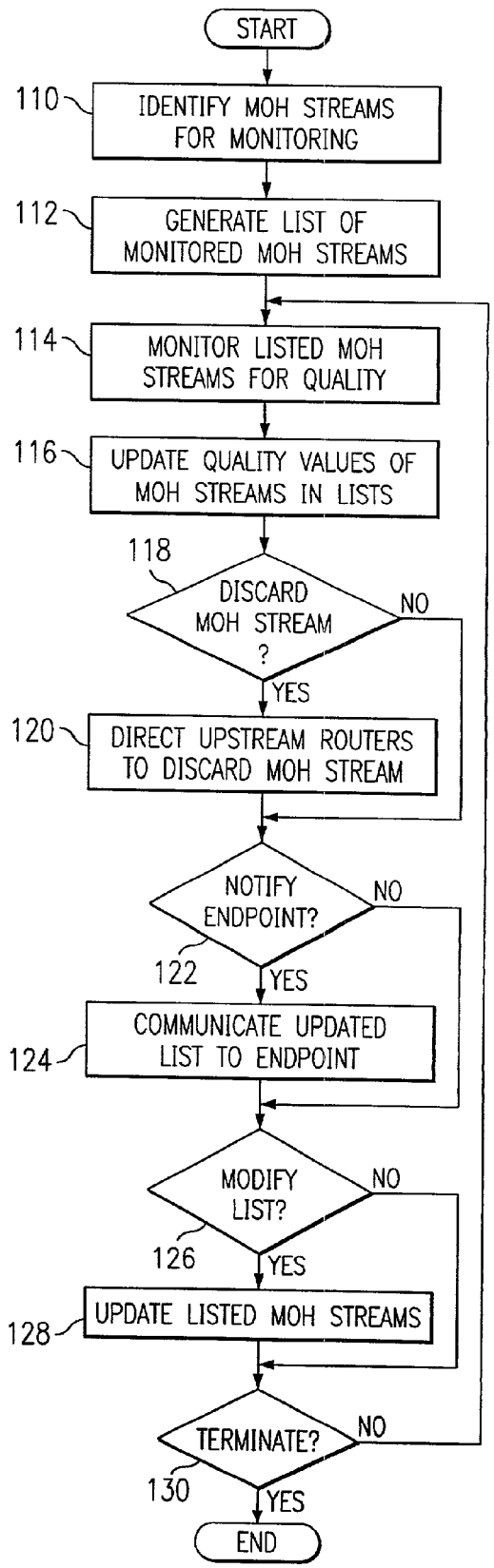
FIG. 5 is a flow diagram illustrating a method for monitoring quality of music-on-hold streams and/or servers at and/or near endpoints of the communications system of FIG. 1 in accordance with one embodiment of the present invention.

FIG. 5 illustrates a method for monitoring quality of music-on-hold streams at or near endpoints of the network 14 in accordance with one embodiment of the present invention. In this embodiment, music-on-hold stream is monitored at or near an endpoint when monitored at the endpoint, at a edge router directly connected to the endpoint, at another network device having a direct connection to the endpoint or at a device between which no significant degradation in quality of the voice stream occurs in normal operation. Degradation is significant where degradation is noticeable or otherwise discernable by a listener at the endpoint.

Referring to FIG. 5, the method begins at step 110 in which music-on-hold streams to be monitored are identified. The music-on-hold streams to be monitored may be those available to an endpoint, may be identified by the call manager 40, may be locally used channels and the like. Identification of a channel may identify a server and conversely, identification of a server, if only providing one channel, may identify a stream.

Proceeding to step 112, a list of the monitored channels is generated. The list may be generated by the entity identifying the streams or may be generated by the endpoint or other device monitoring the streams. At step 114, the listed streams are monitored for quality. As previously described, the streams may be monitored based on packet drops, jitter and other objective and measurable metrics.

At step 116, the quality values for the monitored streams is updated in the list. The quality values may be a then current value such as a running average over a period of seconds or minutes or longer. Next, at decisional step 118, the music-on-hold monitor and/or selector or other device performing monitoring determines whether any of the streams should be discarded. In one embodiment, streams having a poor quality less than a threshhold value such that they are never used for calls on hold, need not be provided to the endpoint and accordingly may be dropped and the bandwidth required to transmit the stream to the endpoint may thus be used for other purposes. As previously discussed, a sliding window may be used for the quality value to provide persistence and hysteresis of high and/or low quality streams. A stream may have a poor quality when packet drops and/or jitter would be readily discernable by a listener to the channel.

If one or more streams should be discarded, the Yes branch of decisional step 118 leads to step 120. At step 120, the monitoring device directs upstream routers to discard the poor quality streams. In a particular embodiment, the upstream core routers 24 may store the identities of the discard streams in the music-on-hold discard list 32 and if all endpoints utilizing the stream indicate that the stream may be dropped, it may then drop the stream.

The No branch of decisional step 118, as well as step 120, lead to decisional step 122. At decisional step 122, if the monitoring is done by an edge router 26 or otherwise near but not at the endpoint, the Yes branch leads to step 124, in which the updated list, including the current quality values are communicated to the endpoint for use in selecting a stream for a call placed on hold. The No branch of decisional step 122, as well as step 124, lead to decisional step 126.

At decisional step 126, it is determined whether a list of monitored streams has been modified. The list may be modified by the entity that originally generated the list, by the endpoint, edge router, or other suitable network device. For example, music-on-hold streams no longer available may be dropped from the list, newly available streams can be added to the list and streams having a low quality for a long period of time may be dropped from the list. If the list is to be modified, the Yes branch of decisional step 126 leads to step 128, in which the list is updated to add and/or remove the streams.

The No branch of decisional step 126, as well as step 128, lead to decisional step 130, in which is determined whether the process should terminate. The process may terminate when the endpoint is shut down or no longer needs to provide on-hold services for calls. If the process will continue, the No branch of decisional step 130 returns to step 114 at which the listed music-on-hold streams continue to be monitored for quality. Upon termination of the process, the Yes branch of decisional step 130 leads to the end of the process. In this way, available music-on-hold streams may be continually monitored to provide high quality audio to calls placed on hold.

Figure 6:
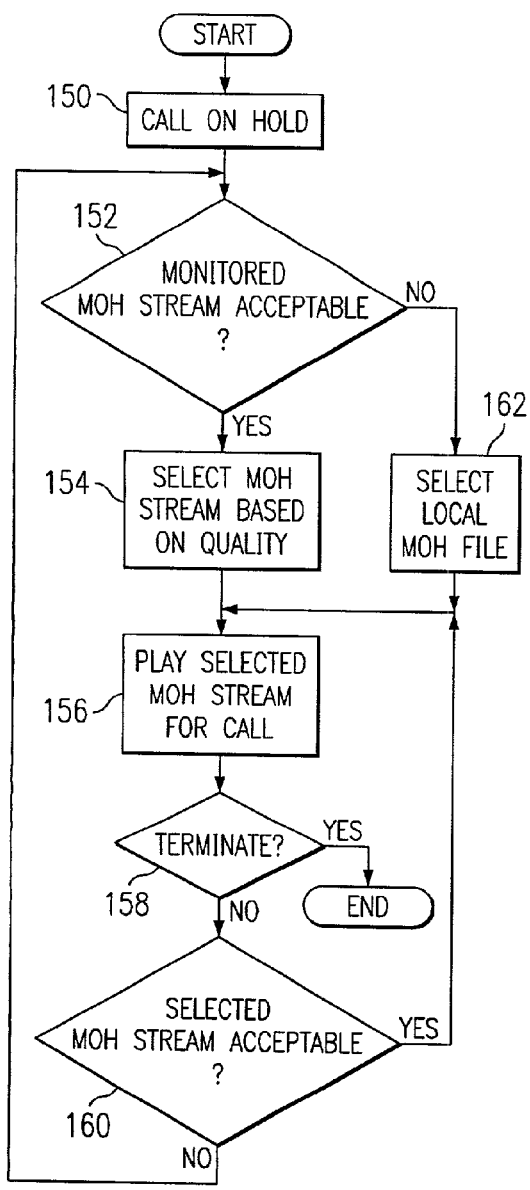
FIG. 6 is a flow diagram illustrating a method for selecting a music-on-hold stream and/or server for playing to a call on hold based on quality of the stream in accordance with one embodiment of the present invention.

FIG. 6 illustrates the method for selecting a music-on-hold stream for playing to a call on hold based on quality in accordance with one embodiment of the present invention.

In this embodiment, the quality of available streams is continuously monitored and recorded in a list and the list reported to the music-on-hold selector. The quality may be otherwise suitably indicated.

Referring to FIG. 6, the method begins at step 150, in which a call is placed on hold. Next, at step 152, the music-on-hold selector-determines whether any of the monitored music-on-hold streams have an acceptable quality value. If one or more streams have an acceptable quality value, the Yes branch of decisional step 152 leads to step 154.

At step 154, a music-on-hold stream is selected from the monitored set of streams based on quality. In one embodiment, the music-on-hold stream having the highest quality value is selected. In another embodiment, a music-on-hold stream having a highest preference and an acceptable quality value is selected. At step 156, the selected music-on-hold stream is played for the call.

Proceeding to decisional step 158, if the call is taken off on hold and the selected music-on-hold stream need no longer be played, the Yes branch leads to the end of the process. If playing of a music-on-hold stream will continue, the No branch leads to decisional step 160. At decisional step 160, the music-on-hold selector 30 determines whether the selected stream remains at an acceptable quality level. If the stream is still acceptable, the Yes branch of decisional step 160 returns to step 156, in which the stream continues to be played out for the call on hold. If the selected stream is no longer acceptable due to degradation in the quality level, the No branch of decisional step 160 returns to step 152 and an alternate source for the music-on-hold is selected. In one embodiment, the selected stream is no longer acceptable after having a drop in quality for a specified period. This provides hysteresis and provides persistence of the selection stream. The endpoint or monitoring device may itself make the switch without interaction with the call manager 40.

At decisional step 152, if none of the monitored streams is an acceptable quality value, such as during a network outage, the No branch leads to step 162. At step 162, a local music-on-hold file is selected. The local file is then played at step 156 for the call. Thus a high quality stream is always provided.

Although the present invention has been described with several embodiments, several changes and modifications may be suggested to one skilled in the art. It is intended that the present invention encompass such changes and modifications as fall within the full scope of the appended claims.

What is claimed is:

1. A method for providing an audio stream in a voice over Internet Protocol (VoIP) environment, comprising:
   determining a quality value for each of a plurality of audio streams communicated in a VoIP format;
   selecting one of the audio streams based on the quality values for the audio streams; and
   facilitating playing of the selected audio stream to a call on hold.

2. The method of claim 1, wherein the audio stream comprises a music-on-hold channel from a music-on-hold server.

3. The method of claim 1, wherein the quality value for an audio stream comprises at least one of packet jitter and packet loss for the audio stream.

4. The method of claim 1, further comprising selecting the audio stream comprising a highest quality value.

5. The method of claim 1, wherein the quality value for an audio stream comprises a current value for the audio stream determined based on real-time performance of the audio stream at a point at least proximate to a device playing the selected audio stream to the call on hold.

6. The method of claim 1, wherein the selected audio stream comprises a first audio stream, further comprising:
   in response to at least degradation of the first audio stream below a threshold, selecting a second audio stream based on a then current quality value for each of the remaining audio streams; and
   facilitating playing of the second audio stream.

7. The method of claim 1, further comprising determining the quality value for each audio stream based on a sliding window of quality metrics for the audio stream.

8. The method of claim 6, wherein facilitating playing of the second audio stream comprises switching from the first audio stream to the second audio stream at an endpoint playing the first and second audio streams to the call on hold.

9. The method of claim 1, further comprising presenting to users for selection only audio streams with a quality value above a threshold.

10. The method of claim 1, wherein determining the quality value for each of the plurality of audio streams comprises:
    receiving the plurality of audio streams; and
    monitoring each of the quality streams based on at least one of packet jitter and packet loss of the audio stream.

11. The method of claim 1, wherein facilitating playing of the selected audio stream to a call on hold comprises communicating at least an identifier of the selected audio stream to an endpoint handling the call on hold.

12. The method of claim 1, wherein determining the quality value for each of the plurality of audio streams comprises receiving the quality values for the audio streams from an upstream device in an Internet Protocol network.

13. The method of claim 12, wherein the upstream device comprises an edge router of the Internet Protocol network.

14. The method of claim 1, further comprising:
    selecting a locally stored audio file in response to at least the quality values for the audio streams being below a threshold value; and
    facilitating playing of the stored audio file to a call on hold.

15. The method of claim 1, further comprising receiving a list of audio streams, the plurality of audio streams including at least one of the audio streams identified by the list.

16. The method of claim 15, wherein the list is generated by a call manager.

17. The method of claim 1, further comprising generating a list of locally used audio streams, the plurality of audio streams including at least one of the locally used audio streams.

18. The method of claim 1, further comprising:
    identifying a poor quality audio stream based on the quality value for the audio stream; and
    communicating an identifier of the poor quality stream to an upstream router for discard of the poor quality audio stream.

19. A system for providing an audio stream in a voice over Internet Protocol (VoIP) environment, comprising:
    means for determining a quality value for each of a plurality of audio streams communicated in a VoIP format;
    means for selecting one of the audio streams based on the quality values for the audio streams; and
    means for facilitating playing of the selected audio stream to a call on hold.

20. The system of claim 19, wherein the audio stream comprises a music-on-hold channel from a music-on-hold server.

21. The system of claim 19, wherein the quality value for an audio stream comprises at least one of packet jitter and packet loss for the audio stream.

22. The system of claim 19, further comprising means for selecting the audio stream comprising a highest quality value.

23. The system of claim 19, wherein the quality value for an audio stream comprises a current value for the audio stream determined based on real-time performance of the audio stream at a point at least proximate to a device playing the selected audio stream to the call on hold.

24. The system of claim 19, wherein the selected audio stream comprises a first audio stream, further comprising:
 means for, in response to at least degradation of the first audio stream below a threshold, selecting a second audio stream based on a then current quality value for each of the remaining audio streams; and
 means for facilitating playing of the second audio stream.

25. The system of claim 19, further comprising means for determining the quality value for each audio stream based on a sliding window of quality metrics for the audio stream.

26. The system of claim 24, wherein facilitating playing of the second audio stream comprises means for switching from the first audio stream to the second audio stream at an endpoint playing the first and second audio streams to the call on hold.

27. The system of claim 19, further comprising means for presenting to users for selection only audio streams with a quality value above a threshold.

28. The system of claim 19, wherein the means for determining the quality value for each of the plurality of audio streams comprises:
 means for receiving the plurality of audio streams; and
 means for monitoring each of the quality streams based on at least one of packet jitter and packet loss of the audio stream.

29. The system of claim 19, wherein facilitating playing of the selected audio stream to a call on hold comprises communicating at least an identifier of the selected audio stream to an endpoint handling the call on hold.

30. The system of claim 19, wherein the means for determining the quality value for each of the plurality of audio streams comprises means for receiving the quality values for the audio streams from an upstream device in an Internet Protocol network.

31. The system of claim 30, wherein the upstream device comprises an edge router of the Internet Protocol network.

32. The system of claim 19, further comprising:
 means for selecting a locally stored audio file in response to at least the quality values for the audio streams being below a threshold value; and
 means for facilitating playing of the stored audio file to a call on hold.

33. The system of claim 19, further comprising means for receiving a list of audio streams, the plurality of audio streams including at least one of the audio streams identified by the list.

34. The system of claim 33, wherein the list is generated by a call manager.

35. The system of claim 19, further comprising means for generating a list of locally used audio streams, the plurality of audio streams including at least one of the locally used audio streams.

36. The system of claim 19, further comprising:
 means for identifying a poor quality audio stream based on the quality value for the audio stream; and
 means for communicating an identifier of the poor quality stream to an upstream router for discard of the poor quality audio stream.

37. A system for providing an audio stream in a voice over Internet Protocol (VoIP) environment, the system comprising instructions embodied in a computer readable medium, which when executed by a computer are operable to:
 determine a quality value for each of a plurality of audio streams communicated in a VoIP format;
 select one of the audio streams based on the quality values for the audio streams; and
 facilitate playing of the selected audio stream to a call on hold.

38. The system of claim 37, wherein the audio stream comprises a music-on-hold channel from a music-on-hold server.

39. The system of claim 37, wherein the quality value for an audio stream comprises at least one of packet jitter and packet loss for the audio stream.

40. The system of claim 37, the instructions further operable to select the audio stream comprising a highest quality value.

41. The system of claim 37, wherein the quality value for an audio stream comprises a current value for the audio stream determined based on real-time performance of the audio stream at a point at least proximate to a device playing the selected audio steam to the call on hold.

42. The system of claim 37, wherein the selected audio stream comprises a first audio stream, the instructions further operable to:
 in response to at least degradation of the first audio stream below a threshold, select a second audio stream based on a then current quality value for each of the remaining audio streams; and
 facilitate playing of the second audio stream.

43. The system of claim 37, the instructions operable to determine the quality value for each audio stream based on a sliding window of quality metrics for the audio stream.

44. The system of claim 42, wherein facilitating playing of the second audio stream comprises switching from the first audio stream to the second audio stream at an endpoint playing the first and second audio streams to the call on hold.

45. The system of claim 37, the instructions further operable to present to users for selection only audio streams with a quality value above a threshold.

46. The system of claim 37, the instructions operable to determine the quality value for each of the plurality of audio streams by:
 receiving the plurality of audio streams; and
 monitoring each of the quality streams based on at least one of packet jitter and packet loss of the audio stream.

47. The system of claim 37, wherein facilitating playing of the selected audio stream to a call on hold comprises communicating at least an identifier of the selected audio stream to an endpoint handling the call on hold.

48. The system of claim 37, the instructions operable to determine the quality value for each of the plurality of audio streams by receiving the quality values for the audio streams from an upstream device in an Internet Protocol network.

49. The system of claim 48, wherein the upstream device comprises an edge router of the Internet Protocol network.

50. The system of claim 37, the instructions further operable to:

select a locally stored audio file in response to at least the quality values for the audio streams being below a threshold value; and facilitate playing of the stored audio file to a call on hold.

51. The system of claim 37, the instructions further operable to receive a list of audio streams, the plurality of audio streams including at least one of the audio streams identified by the list.

52. The system of claim 51, wherein the list is generated by a call manager.

53. The system of claim 37, the instructions further operable to generate a list of locally used audio streams, the plurality of audio streams including at least one of the locally used audio streams.

54. The system of claim 37, the instructions further operable to:

identify a poor quality audio stream based on the quality value for the audio stream; and communicate an identifier of the poor quality stream to an upstream router for discard of the poor quality audio stream.

55. A method for providing music-on-hold at an endpoint of an Internet Protocol network, comprising:

receiving a plurality of music-on-hold streams;

repetitively determining a real-time quality value for each of the audio streams based on at least one of packet jitter and packet loss for the music-on-hold stream;

in response to at least a call being placed on hold, selecting one of the music-on-hold streams as a high quality stream based on the real-time quality values for the music-on-hold streams; and playing the high quality stream to the call on hold.

56. The method of claim 1, wherein facilitating playing of the selected audio stream to a call on hold comprises playing the selected audio stream at an endpoint.

57. The system of claim 19, wherein facilitating playing of the selected audio stream to a call on hold comprises playing the selected audio stream at an endpoint.

58. The system of claim 37, wherein facilitating playing of the selected audio stream to a call on hold comprises playing the selected audio stream at an endpoint.

* * * * *